(12) United States Patent
Li et al.

(10) Patent No.: US 8,780,308 B2
(45) Date of Patent: Jul. 15, 2014

(54) PIXEL STRUCTURE AND DISPLAY PANEL

(71) Applicants: Chun Li, Suzhou (CN); Kun-Piao Lin, Hsin-Chu (TW); Huan-Liang Shen, Suzhou (CN)

(72) Inventors: Chun Li, Suzhou (CN); Kun-Piao Lin, Hsin-Chu (TW); Huan-Liang Shen, Suzhou (CN)

(73) Assignees: AU Optronics (Suzhou) Corp., Ltd., Suzhou (CN); AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/666,049

(22) Filed: Nov. 1, 2012

(65) Prior Publication Data
US 2013/0265514 A1 Oct. 10, 2013

(30) Foreign Application Priority Data
Apr. 6, 2012 (CN) .......................... 2012 1 0110901

(51) Int. Cl.
*G02F 1/1343* (2006.01)
(52) U.S. Cl.
CPC .. *G02F 1/1343* (2013.01); *G02F 2001/134345* (2013.01)
USPC .......................................... 349/141; 349/144
(58) Field of Classification Search
CPC .................. G02F 2001/134345; G02F 1/1343
USPC .................................................... 349/141, 144
See application file for complete search history.

(56) References Cited

U.S. PATENT DOCUMENTS

| 2005/0094077 A1* | 5/2005 | Baek .............................. 349/141 |
| 2007/0296883 A1 | 12/2007 | Kwon et al. |
| 2011/0299022 A1* | 12/2011 | Li et al. ......................... 349/143 |

FOREIGN PATENT DOCUMENTS

| CN | 1621928 | 6/2005 |
| CN | 101097368 A | 1/2008 |
| CN | 101149494 A | 3/2008 |
| CN | 101349848 | 1/2009 |
| CN | 102213869 A | 10/2011 |
| JP | 2009122212 A | 6/2009 |

* cited by examiner

*Primary Examiner* — Lucy Chien
(74) *Attorney, Agent, or Firm* — WPAT, PC; Justin King (57) ABSTRACT

Disclosed herein is a pixel structure switchable between a wide viewing angle mode and a narrow viewing angle mode. The pixel structure includes a first substrate, a first and a second gate lines, a data line, a pixel unit, a second substrate and a display medium. The pixel unit includes a first active element, a second active element, a first sub-pixel electrode, a second sub-pixel electrode, and a common electrode. The first and second sub-pixel electrodes are respectively electrically connected to the first and second active elements. The common electrode is opposite to the first and second sub-pixel electrodes. The second substrate has a counter electrode disposed on a surface facing the first substrate. The counter electrode is corresponding to the first sub-pixel electrode.

19 Claims, 11 Drawing Sheets

Egual contrast ratio contour

FIG. 6A

Egual contrast ratio contour

FIG. 6B

PIXEL STRUCTURE AND DISPLAY PANEL

CROSS REFERENCE TO RELATED APPLICATIONS

This application claims priority to Chinese Application Serial Number 201210110901.7, filed Apr. 6, 2012, the disclosure of which are incorporated herein by reference in their entireties.

BACKGROUND

1. Technical Field

The present invention relates to a pixel structure and a display panel. More particularly, the present invention relates to a pixel structure and a display panel that are switchable between a wide viewing angle mode and a narrow viewing angle mode.

2. Description of Related Art

Conventional display devices may be operated in only one of a wide viewing angle mode and a narrow viewing angle mode. Techniques such as multi-domain vertical alignment (MVA) and in-plane switch (IPS) are employed in liquid crystal displays (LCDs) with wide viewing angles. Conventional twisted nematic LCDs have narrow viewing angles. None of the technologies mentioned above may provide a display device that is switchable between a wide viewing angle mode and a narrow viewing angle mode. However, for the reason of privacy, users need display devices that may be switchable between wide and narrow viewing angle modes, depending on the intention of the users. Accordingly, there exists in this art a need for a new LCD that is switchable between a wide viewing angle mode and a narrow viewing angle mode.

SUMMARY

According to one aspect of the invention, a pixel structure is provided. The pixel structure comprises a first substrate, a first and a second gate lines, a data line, a pixel unit, a second substrate and a display medium. The first gate line and the second gate line are disposed on the first substrate. The data line is disposed on the first substrate and intersects the first and the second gate lines. The pixel unit is disposed between the first gate line, the second gate line and the data line. The pixel unit includes a first active element, a second active element, a first sub-pixel electrode, a second sub-pixel electrode and a common electrode. The first active element is electrically connected to the first gate line and the data line. The second active element is electrically connected to the second gate line and the data line. The first sub-pixel electrode is electrically connected to the first active element. The second sub-pixel electrode is spaced apart from the first sub-pixel electrode, and is electrically connected to the second active element. The common electrode is opposite to the first sub-pixel electrode and the second sub-pixel electrode, wherein the first and second sub-pixel electrodes or the common electrode has at least one slit pattern. The second substrate has a counter electrode which is disposed on a surface of the second substrate facing the first substrate. The counter electrode is corresponding to the first sub-pixel electrode. The display medium is disposed between the first substrate and the second substrate.

According to one embodiment of the invention, the counter electrode is configured to apply an electrical potential such that a perpendicular electric field is formed between the counter electrode and the first sub-pixel electrode.

In one embodiment of the invention, the electrical potential of the counter electrode is between an electrical potential of the common electrode and an electrical potential of the first sub-pixel electrode.

In one embodiment of the invention, the counter electrode has a floating electrical potential.

In one embodiment of the invention, the counter electrode is substantially corresponding to the first sub-pixel electrode only.

In one embodiment of the invention, the first sub-pixel electrode is spaced apart from the second sub-pixel electrode by a gap that extends in a direction parallel with the data line.

In one embodiment of the invention, the first sub-pixel electrode is spaced apart from the second sub-pixel electrode by a gap that extends in a direction parallel with the first gate line.

In one embodiment of the invention, the first sub-pixel electrode is spaced apart from the second sub-pixel electrode by a gap, wherein a portion of the gap extends in a direction parallel with the data line, and another portion of the gap extends in a direction perpendicular to the data line.

According to another aspect of the invention, a display panel is provided. The display panel comprises a first substrate, a data line, a first gate line, a second gate line, a third gate line, a fourth gate line, a first sub-pixel, a second sub-pixel, a third sub-pixel, a fourth sub-pixel, a second substrate, a display medium, a first switch, a second switch, a third switch and a fourth switch. The data line is disposed on the first substrate. The first, second, third and fourth gate lines are disposed on the first substrate and intersect the data line, and thereby defining a first display area, a second display area, a third display area and a fourth display area on the first substrate, wherein the first and second display areas are between the first gate line and the second gate line, and the third and fourth display areas are between the third gate line and the fourth gate line. The first sub-pixel is disposed in the first display area and is electrically connected to the first gate line and the data line. The second sub-pixel is disposed in the second display area and is electrically connected to the second gate line and the data line. The third sub-pixel is disposed in the third display area and is electrically connected to the third gate line and the data line. The fourth sub-pixel is disposed in the fourth display area and is electrically connected to the fourth gate line and the data line. The second substrate has a counter electrode disposed on a surface thereof. The counter electrode faces the first substrate, and is corresponding to the first sub-pixel and the third sub-pixel. The display medium includes liquid crystal material. The display medium is disposed between the first substrate and the second substrate. The first switch has a terminal coupled to the first gate line, and has another terminal coupled to the second gate line and a gate driver. The second switch has a terminal coupled to the third gate line, and has another terminal coupled to the fourth gate line and the gate driver. The third switch has a terminal coupled to the first gate line. The fourth switch has a terminal coupled to the third gate line.

In one embodiment of the invention, each of the first, second, third and fourth switches has a control terminal coupled to a control element that is configured to control a ON/OFF state of each of the first, second, third and fourth switches.

In one embodiment of the invention, when the display panel is operated in a narrow viewing angle mode, the first and second switches are turned off and both the first and third gate lines are coupled to a control signal, in which the counter electrode is coupled to a pre-determined electrical potential, such that a perpendicular electric field is formed between the counter electrode and the first sub-pixel and between the counter electrode and the third sub-pixel.

In one embodiment of the invention, the control signal coupled to the first and third gate lines is a substantially constant electrical potential.

In one embodiment of the invention, the gate driver is configured to output a plurality of gate driving signals to the second gate line and the fourth gate line in sequence.

In one embodiment of the invention, when the display panel is operated in a narrow viewing angle mode, the first and second switches are turned off and both the first and third gate lines are coupled to a control signal, in which the counter electrode is coupled to a pre-determined electrical potential, such that the orientation of the liquid crystal material in the first and third display areas is different from that in the second and fourth display areas.

In one embodiment of the invention, the first display area and the third display area are capable of generating a perpendicular electric field, and the second display area and the fourth display area are capable of generating a horizontal electric field.

In one embodiment of the invention, the gate driver is configured to output a plurality of gate driving signals to the second gate line and the fourth gate line in sequence.

In one embodiment of the invention, when the display panel is operated in a wide viewing angle mode, the third and fourth switches are turned off, but the first and second switches are turned on, and thereby allowing a plurality of gate driving signals to be transmitted to the first, second, third and fourth gate lines, wherein the counter electrode has a floating electrical potential.

In one embodiment of the invention, the first sub-pixel and the second sub-pixel comprise a first common electrode disposed in the first and second display areas. The first sub-pixel comprises a first active element and a first sub-pixel electrode electrically connected to the first active element. The second sub-pixel comprises a second active element and a second sub-pixel electrode electrically connected to the second active element. The first and second sub-pixel electrodes are configured to be opposite to the first common electrode. The first and second sub-pixel electrodes or the first common electrode has at least one slit pattern. The third sub-pixel and the fourth sub-pixel comprise a second common electrode disposed in the third display area and the fourth display area. The third sub-pixel comprises a third active element and a third sub-pixel electrode electrically connected to the third active element, and the fourth sub-pixel comprises a fourth active element and a fourth sub-pixel electrode electrically connected to the fourth active element. The third and fourth sub-pixel electrodes are configured to be opposite to the second common electrode. The third and fourth sub-pixels or the second common electrode has at least one slit pattern.

In one embodiment of the invention, when the display panel is operated in a narrow viewing angle mode, the first and second switches are turned off and both the first and third gate lines are coupled to a substantially constant electrical potential, in which the counter electrode is coupled to a predetermined electrical potential, and thereby allowing a perpendicular electric field to be generated between the counter electrode and the first sub-pixel as well as between the counter electrode and the third sub-pixel.

In one embodiment of the invention, the pre-determined electrical potential ranges from an electrical potential of one of the first and second common electrodes to an electrical potential of one of the first, second, third and fourth sub-pixel electrodes.

In one embodiment of the invention, the first common electrode is overlapped with the first and second sub-pixel electrodes, and the second common electrode is overlapped with the third and fourth sub-pixel electrodes, and wherein an insulating layer is interposed between the first common electrode and the first and second sub-pixel electrodes as well as between the second common electrode and the third and fourth sub-pixel electrodes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
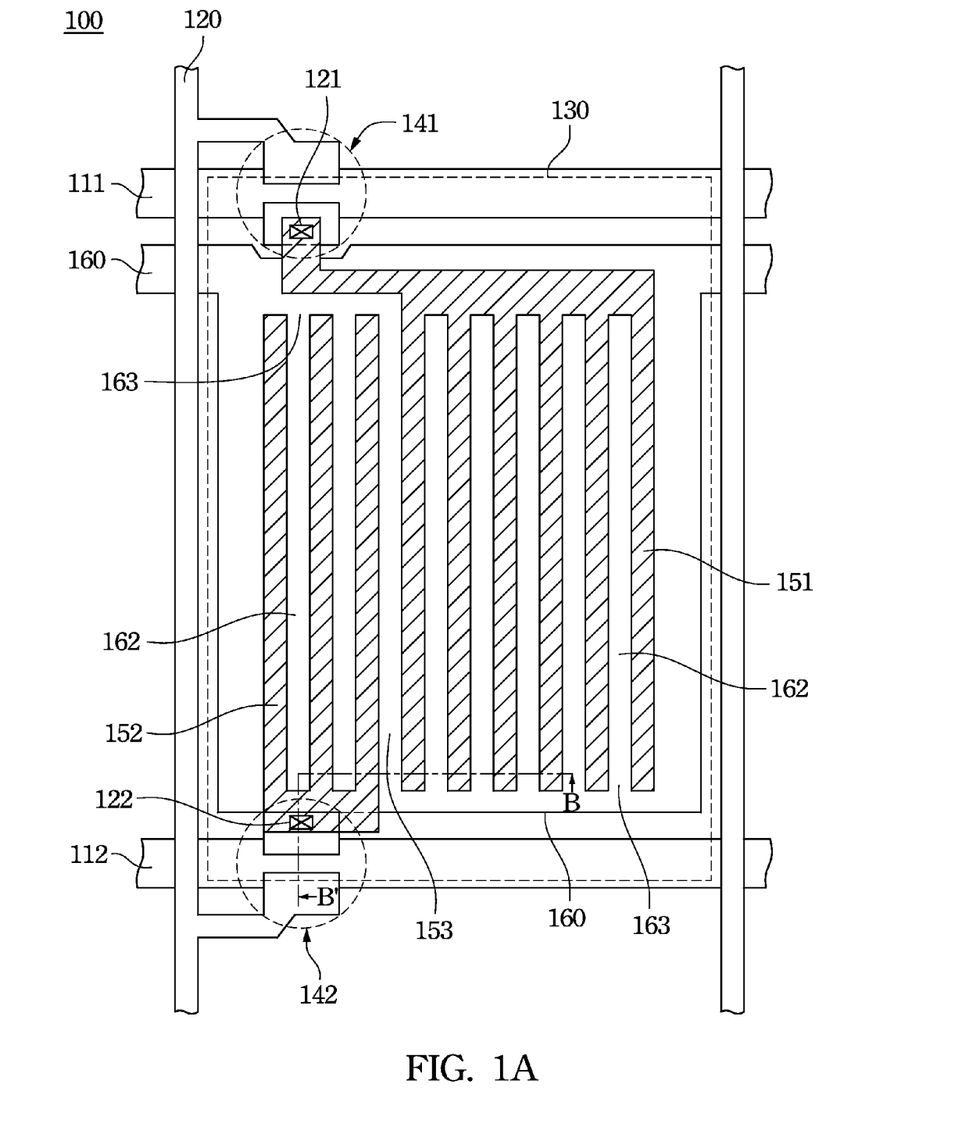
FIG. 1A is a top view schematically illustrating a pixel structure according to one embodiment of the invention.
Figure 1B:
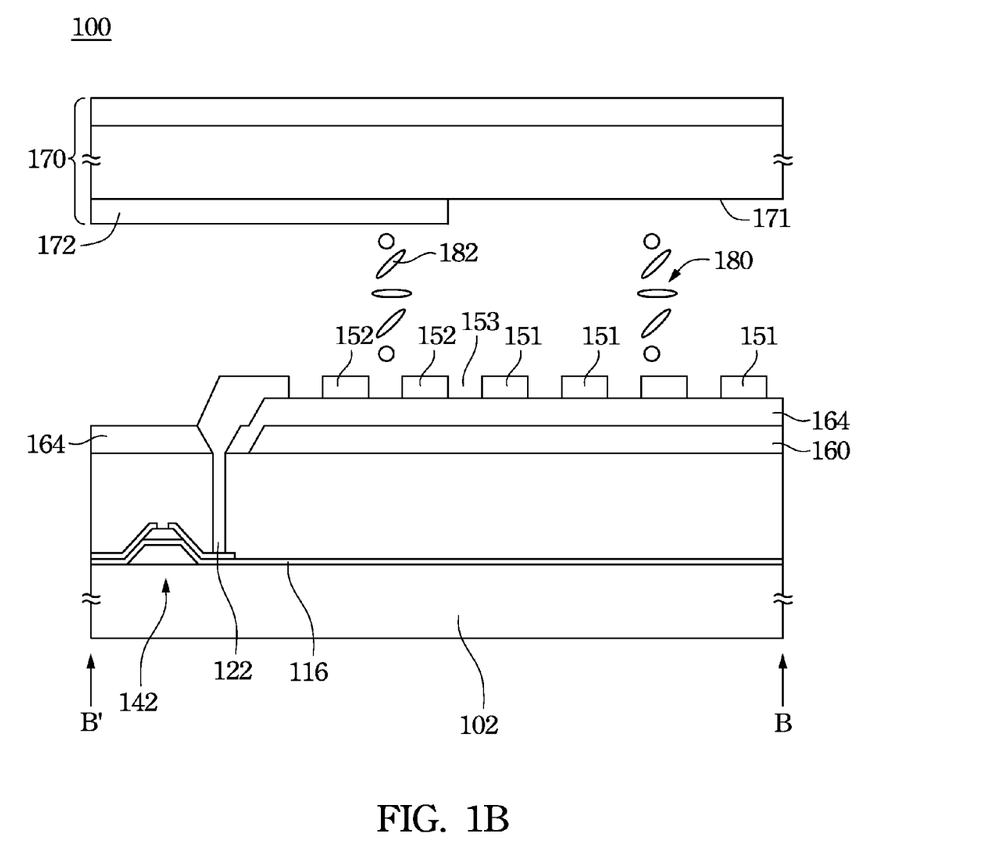
FIG. 1B is a cross-sectional view along line B-B' in FIG. 1A.

FIG. 1A is a top view schematically illustrating a pixel structure 100 according to one embodiment of the invention. FIG. 1B is a cross-sectional view along line B-B' in FIG. 1A.

With reference to FIGS. 1A and 1B, the pixel structure 100 includes a first substrate 102, a first gate line 111, a second gate line 112, a data line 120, a pixel unit 130, a second substrate 170 and a display medium 180.

The first substrate 102 is configured to allow the first gate line 111, the second gate line 112, the data line 120 and the pixel unit 130 to be disposed thereon. There is no specific limitation on the material and the thickness of the first substrate 102, so long as it has a sufficient mechanical strength and suitable chemical stability. For instance, the first substrate 102 may be a glass substrate or a substrate made of a polymeric material such as polyimide.

The first gate line 111 and the second gate line 112 are disposed on the first substrate 102. In one embodiment, the first gate line 111 and the second gate line 112 are parallel with each other. The first gate line 111 and the second gate line 112 may be formed from a same metal layer and be patterned by a single photolithographic process.

The data line 120 is disposed to cross over the first gate line 111 and the second gate line 112. Specifically, the data line 120 is formed from a metallic layer that is different from the first gate line 111 and the second gate line 112. In one example, a gate insulating layer 116 may be formed over the first gate line 111 and the second gate line 112, and the data line 120 is formed on the gate insulating layer 116 and crosses over the first gate line 111 and the second gate line 112.

The pixel unit 130 is arranged between the first gate line 111, the second gate line 112 and the data line 120. The pixel unit 130 includes a first active element 141, a second active element 142, a first sub-pixel electrode 151, a second sub-pixel electrode 152 and a common electrode 160, and these elements are described in detail hereinafter.

The first active element 141 is electrically connected to both the first gate line 111 and the data line 120, whereas the second active element 142 is electrically connected to both the second gate line 112 and the data line 120. The ON/OFF states of the first active element 141 and the second active element 142 are respectively controlled by voltage signals applied to the first gate line 111 and the second gate line 112. In one embodiment, the first active element 141 and the second active element 142 are thin film transistors, in which the source electrodes of the first active element 141 and the second active element 142 are connected to the data line 120, and the gate electrodes of the first active element 141 and the second active element 142 are respectively connected to the first gate line 111 and the second gate line 112.

The first sub-pixel electrode 151 and the second sub-pixel electrode 152 are electrically connected to the first active element 141 and the second active element 142, respectively. When the first active element 141 and the second active element 142 are turned on, the current and/or voltage on the data line 120 may through the first active element 141 and the second active element 142 be transmitted to the first sub-pixel electrode 151 and the second sub-pixel electrode 152, respectively. In other words, the first active element 141 and the second active element 142 are capable of controlling whether the electrical signal on the data line 120 is transmitted to the first sub-pixel electrode 151 and the second sub-pixel electrode 152. In one embodiment, the first sub-pixel electrode 151 is electrically connected to a drain electrode of the first active element 141 through the first contact window 121. The second sub-pixel electrode 152 is electrically connected to a drain electrode of the second active element 142 through the second contact window 122, as depicted in FIG. 1B.

The first sub-pixel electrode 151 is spaced apart from the second sub-pixel electrode 152. That is, the first sub-pixel electrode 151 is not in contact with the second sub-pixel electrode 152. In one embodiment, the first sub-pixel electrode 151 is spaced apart from the second sub-pixel electrode 152 by a gap 153 that extends in a direction parallel with the data line 120.

Figure 1C:
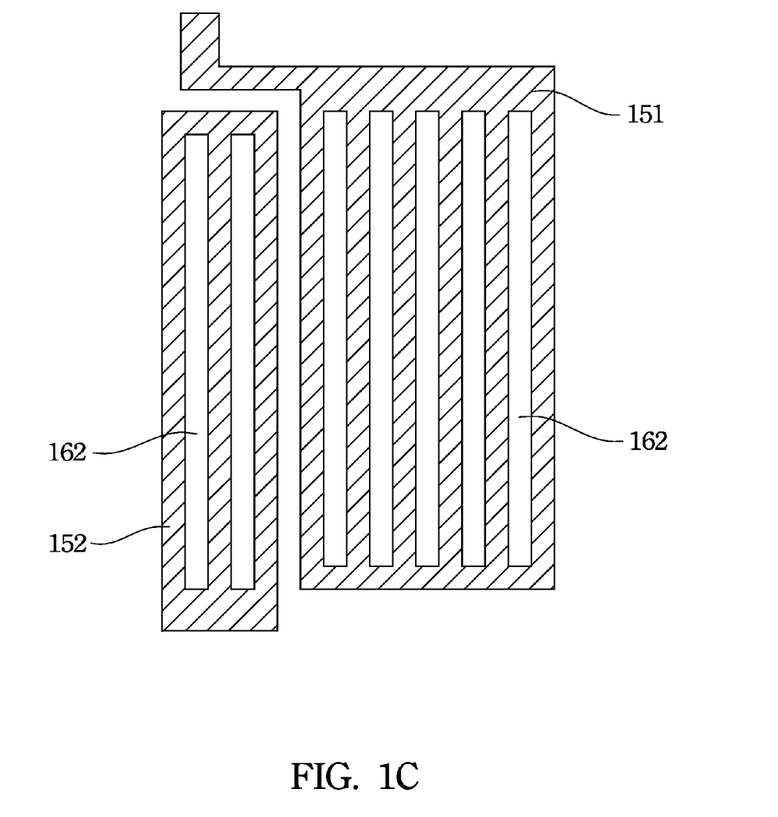
FIG. 1C is a top view schematically illustrating the first and second sub-pixel electrodes according to another embodiment of the invention.

The first sub-pixel electrode 151 and the second sub-pixel electrode 152 may have at least one slit pattern, as depicted in FIG. 1A. In the embodiment depicted in FIG. 1A, the first sub-pixel electrode 151 and the second sub-pixel electrode 152 each have a respective slit 162, and each of the slits 162 has an opening 163, so that the first sub-pixel electrode 151 and the second sub-pixel electrode 152 forms fringe electrodes. FIG. 10 is a top view schematically illustrating the first sub-pixel electrode 151 and the second sub-pixel electrode 152 according to another embodiment of the invention. In this embodiment, the first sub-pixel electrode 151 and the second sub-pixel electrode 152 encircle respective slits 162, so as to form closed slits 162. In one example, the area of the first sub-pixel electrode 151 is greater than that of the second sub-pixel 152.

The common electrode 160 is opposite to the first sub-pixel electrode 151 and the second sub-pixel electrode 152, as depicted in FIG. 1A and FIG. 1B. An electric field may be generated between the common electrode 160 and the first sub-pixel electrode 151 as well as between the common electrode 160 and the second sub-pixel electrode 152 for the purpose of controlling the optical properties of the display medium 180. In one embodiment, the first sub-pixel electrode 151 and the second sub-pixel electrode 152 are disposed above the common electrode 160, and the common electrode 160 overlaps the first sub-pixel electrode 151 and the second sub-pixel electrode 152, as depicted in FIG. 1A. An insulating layer 164 may be arranged between the common electrode 160 and the first sub-pixel electrode 151 and the second sub-pixel electrode 152, so that the first sub-pixel electrode 151 and the second sub-pixel electrode 152 are not in contact with the common electrode 160. In one embodiment, each of the common electrode 160, the first sub-pixel electrode 151 and the second sub-pixel electrode 152 comprises a transparent conductive material such as indium tin oxide.

The display medium 180 is disposed between the first substrate 102 and the second substrate 170. In one example, the display medium 180 is disposed above the first sub-pixel electrode 151 and the second sub-pixel electrode 152. The display medium 180 may comprise liquid crystal material 182 or other light modulators.

The second substrate 170 has a counter electrode 172, as depicted in FIG. 1B. The counter electrode 172 is disposed on a surface 171 of the second substrate 170, and faces the first substrate 102. It is noted that the counter electrode 172 is configured to correspond to the second sub-pixel electrode 152. In one embodiment, the counter electrode 172 is disposed at a position substantially right above the second sub-pixel electrode 152. However, at a position right above the first sub-pixel electrode 151, there does not exist the counter electrode 172. More specifically, the counter electrode 172 is corresponding with only the second sub-pixel electrode 152.

Figure 1D:
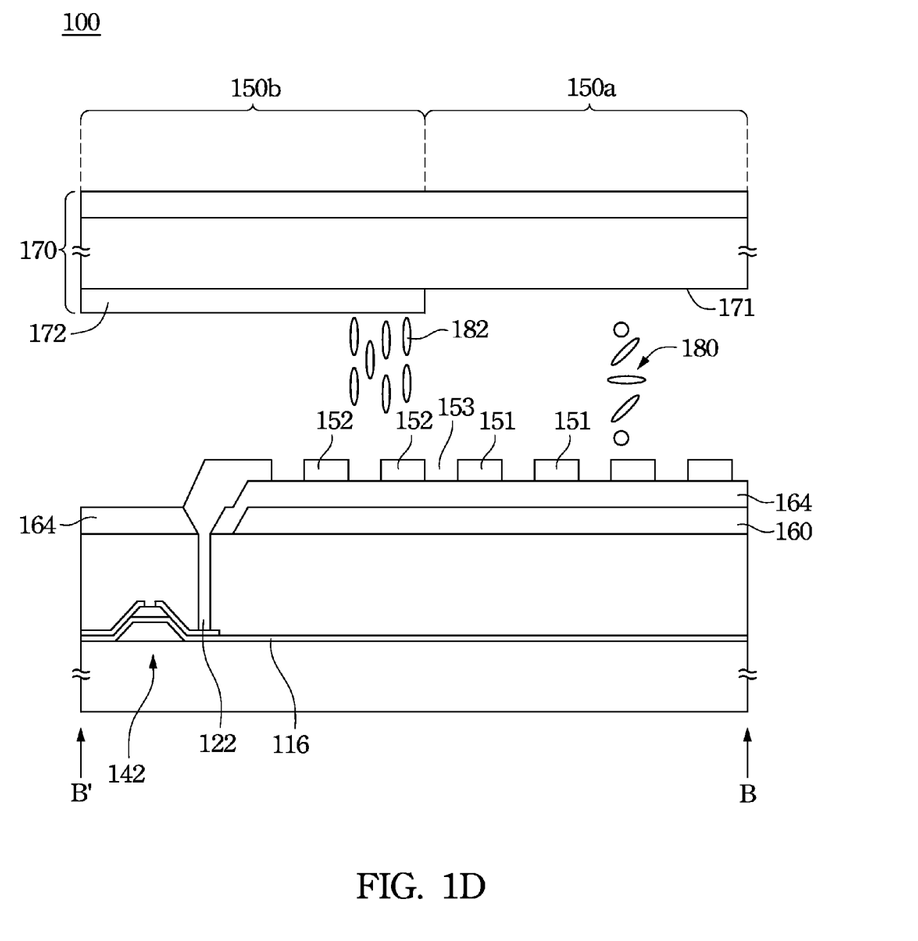
FIG. 1D is a cross-sectional view schematically illustrating the orientation of liquid crystal material between the second sub-pixel electrode and the counter electrode when an electrical potential is applied to the counter electrode

The counter electrode 172 is operable to control the viewing angle of the pixel structure 100. Specifically, an electric field may be generated between the counter electrode 172 and the second sub-pixel electrode 152 by applying an electrical potential to the counter electrode 172, such that the display medium 180 between the counter electrode 172 and the second sub-pixel electrode 152 causes light leakage at a large viewing angle. As a result, the pixel structure 100 exhibits a narrow viewing angle mode. In one embodiment, as depicted in FIG. 1D, when an electrical potential is applied to the counter electrode 172, the pixel structure 100 may be divided into a first display area 150a and a second display area 150b. In the second display area 150b, there is generated a perpendicular electric field between the second sub-pixel electrode 152 and the counter electrode 172. The perpendicular electric field is in a direction vertical to the second sub-pixel electrode 152 and the counter electrode 172, and thereby the principal direction of the display medium 180 such as liquid crystal material 182 is perpendicular to a surface 171 of the second substrate 170. Accordingly, the viewing angle of the pixel structure 100 is narrowed because light leakage occurs in the second display area 150b at a large viewing angle due to the perpendicular orientation of the liquid crystal material 182. In other words, the display device is operated in a narrow viewing angle mode under this condition. To the contrary, when these is no voltage to be applied to the counter electrode 172 (for example, the counter electrode 172 has a floating electrical potential), the optical properties of the first display area 150a is substantially the same as that of the second display area 150b, and thereby the pixel structure 100 exhibits a wide viewing angle mode. In one example, when the pixel structure 100 is operated in the narrow viewing angle mode, the voltage applied to the counter electrode 172 is between the voltage of the common electrode 160 and the voltage of the second sub-pixel electrode 152. On the other hands, when there is no voltage applied to the counter electrode 172, the counter electrode 172 is at a floating electrical potential and thus the pixel structure 100 is operated in the wide viewing angle mode. According to the embodiments described above, the display device may selectively be operated in either the wide viewing angle mode or the narrow viewing angle mode.

Figure 2:
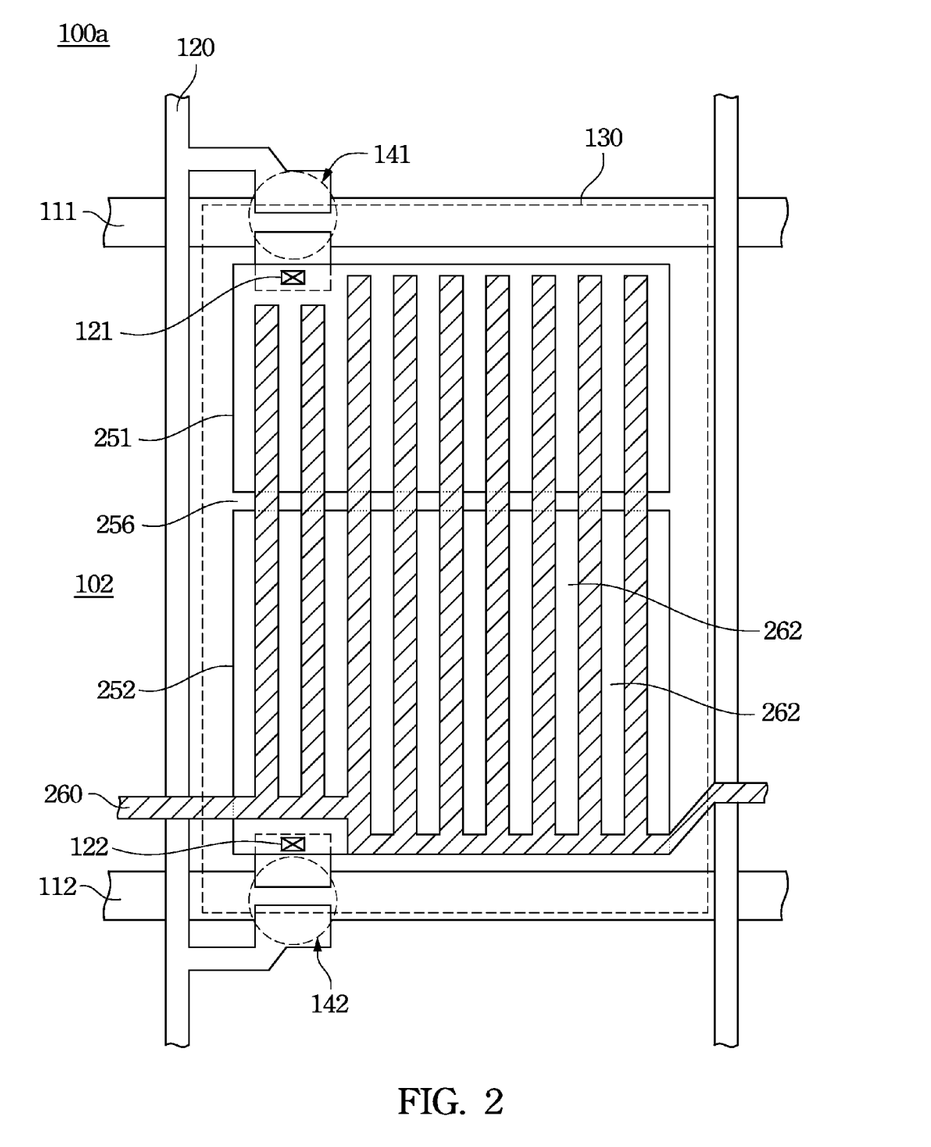
FIG. 2 is a top view schematically illustrating a pixel structure according to another embodiment of the invention.

FIG. 2 is a top view schematically illustrating a pixel structure 100a according to another embodiment of the invention. In this embodiment, the first substrate 102, the first gate line 111, the second gate line 112, the data line 120, the second substrate 170 and the display medium 180 may be the same as the embodiments or examples described above in connection with FIGS. 1A to 1D. However, the pixel unit 130 of the pixel structure 100a in this embodiment differs from the embodiments described above in connection with FIGS. 1A to 1D in structure.

With reference to FIG. 2, the pixel unit 130 includes a first active element 141, a second active element 142, a first sub-pixel electrode 251, a second sub-pixel electrode 252 and a common electrode 260. It is noted that both the first sub-pixel electrode 251 and the second sub-pixel electrode 252 have rectangular patterns, whereas the first and second sub-pixel electrodes 151, 152 in FIG. 1B have fringe patterns. In addition, the common electrode 260 depicted in FIG. 2 has one or more slits 262 so as to form a comb electrode. In contrast, the common electrode 160 depicted in FIG. 1B does not have any slit pattern. Therefore, according to the embodiments of the invention, either the common electrode or the first and second sub-pixel electrodes has at least one slit pattern.

In the embodiment depicted in FIG. 2, the common electrode 260 is disposed above both the first and second sub-pixel electrodes 251, 252. The common electrode 260 is configured to apply a common voltage to the pixel structure 100a. The first sub-pixel electrode 251 may be electrically connected to the first active element 141 through the first contact window 121, and is further electrically connected to the data line 120. Similarly, the second sub-pixel electrode 252 may be electrically connected to the second active element 142 through the second contact window 122, and is further electrically connected to the data line 120. The first sub-pixel electrode 251 is spaced apart from the second sub-pixel electrode 252 by a gap 256, so that first sub-pixel electrode 251 is not in contact with the second sub-pixel electrode 252.

Figure 3A:
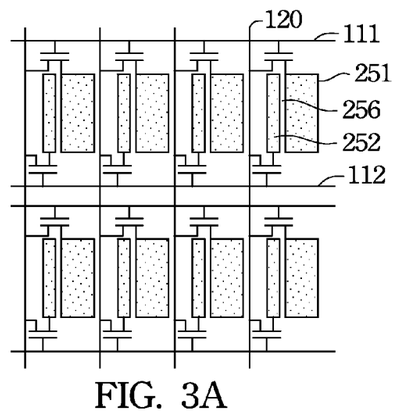
FIGS. 3A-3E are top views schematically illustrating the arrangement of the first and second sub-pixel electrodes according to the embodiments of the invention.
Figure 3B:
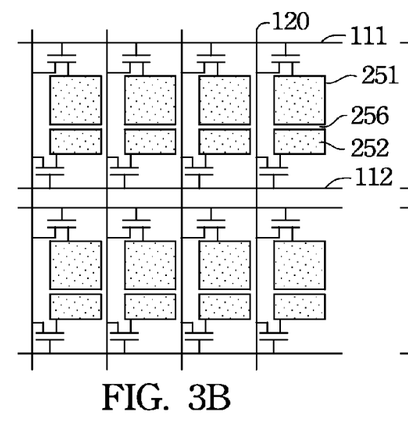
Figure 3C:
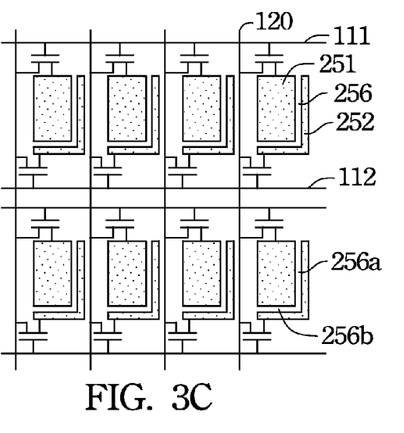
Figure 3D:
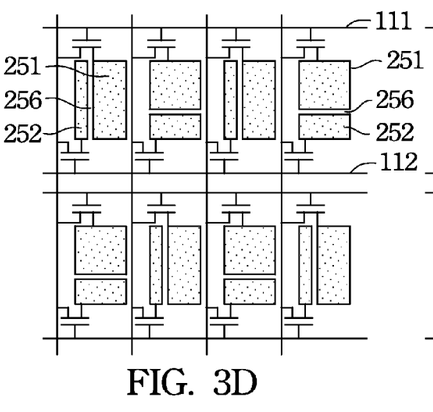
Figure 3E:
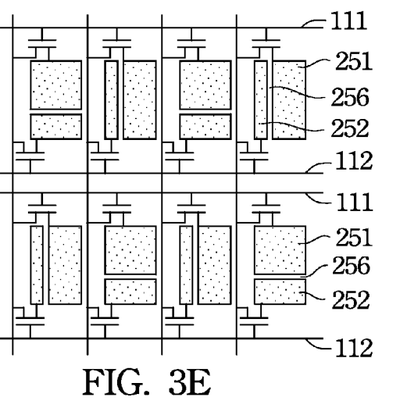

FIGS. 3A-3C are top views schematically illustrating the arrangement of the first and second sub-pixel electrodes 251, 252 according to the embodiments of the invention. In FIG. 3A, the gap 256 between the first sub-pixel electrode 251 and the second sub-pixel electrode 252 extends in a direction parallel with the data line 120. In FIG. 3B, the gap 256 extends in a direction parallel with the first gate line 111. In FIG. 3C, a portion 256a of the gap 256 between the first sub-pixel electrode 251 and the second sub-pixel electrode 252 extends in a direction parallel with the data line 120, whereas another portion 256b of the gap 256 extends in a direction perpendicular to the data line 120. The arrangements of the first and second sub-pixel electrodes 251, 252 described above may be combined in a display panel. For example, as depicted in FIGS. 3D and 3E, a display panel may includes two or more pixel structures, in which the arrangement of the first and second sub-pixel electrodes 251, 252 in one pixel is different from that in another pixel.

Figure 4A:
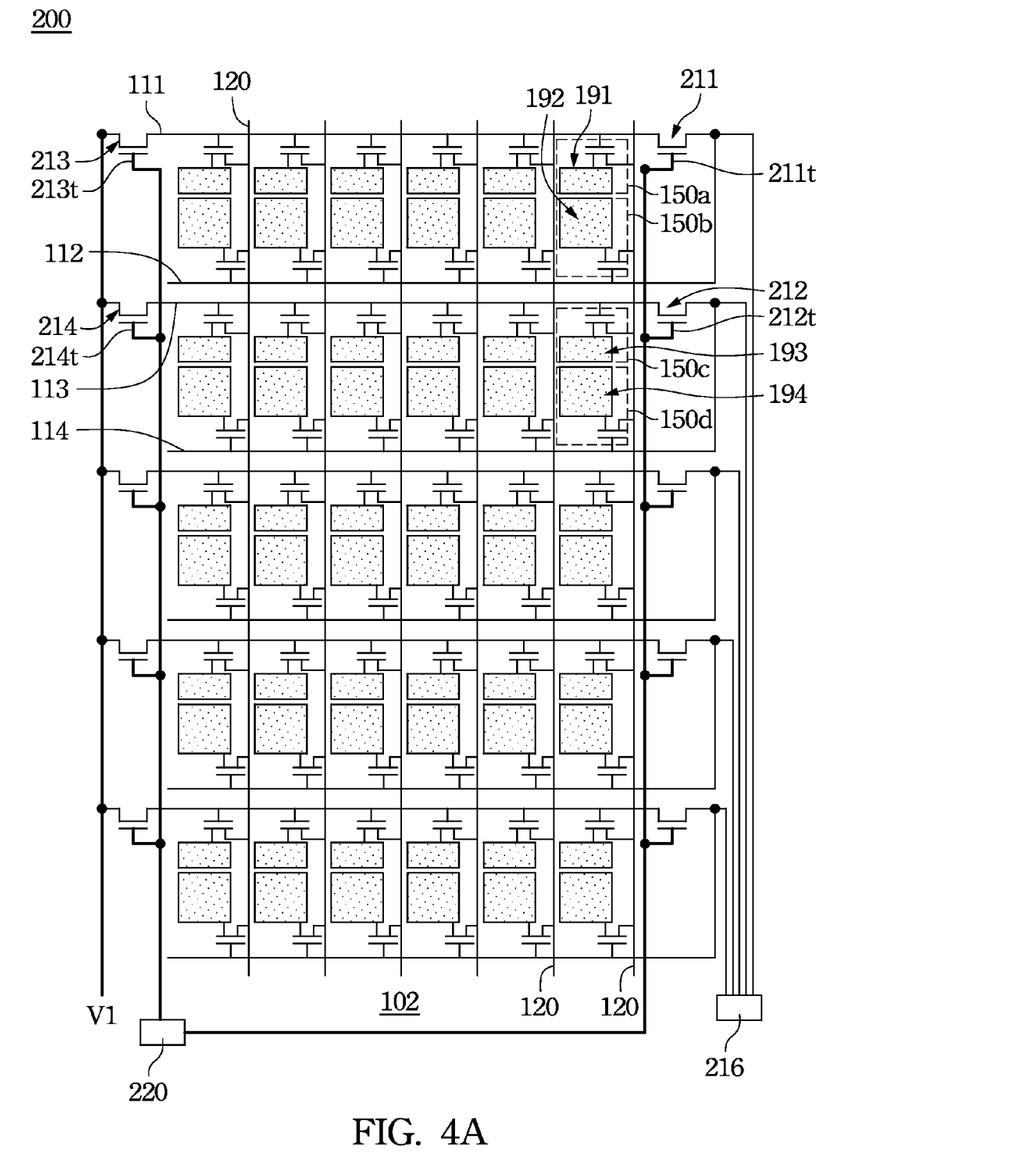
FIG. 4A schematically depicts a display panel according to one embodiment of the invention.

According to another aspect of the invention, a display panel is provided. FIG. 4A schematically depicts a display panel 200 according to one embodiment of the invention. The display panel 200 includes at least one pixel structure 100 (or 100a) described above. The cross-sectional structure of the display panel 200 may be similar to that depicted in FIG. 1B. For the purpose of simplifying the figure, the second substrate 170 and the display medium 180 such as liquid crystal material 182 are not shown in FIG. 4A.

With reference to FIG. 4A, the display panel 200 includes a first substrate 102, a data line 120, a first gate line 111, a second gate line 112, a third gate line 113, a fourth gate line 114, a first sub-pixel 191, a second sub-pixel 192, a third sub-pixel 193, a fourth sub-pixel 194, a first switch 211, a second switch 212, a third switch 213 and a fourth switch 214. In addition, the display panel 200 further includes a second substrate 170 and a display medium 180 such as liquid crystal material 182 (depicted in FIG. 1B). The display medium 180 is disposed between the first substrate 102 and the second substrate 170.

The first, second, third and fourth gate lines 111, 112, 113 and 114 and the data line 120 are similar to these described above in connection with the pixel structure 100. Briefly, the first, second, third and fourth gate lines 111, 112, 113 and 114 are disposed on the first substrate 102. The data line 120 is disposed on the first substrate 102, and intersects the first, second, third and fourth gate lines 111, 112, 113 and 114, so as to define a first display area 150a, a second display area 150b, a third display area 150c and a fourth display area 150d on the first substrate 102. Both the first display area 150a and second display area 150b are arranged between the first gate line 111 and the second gate line 112, whereas both the third display area 150c and the fourth display area 150d are arranged between the third gate line 113 and the fourth gate line 114.

The first, second, third and fourth sub-pixels 191, 192, 193 and 194 are respectively disposed in the first, second, third and fourth display areas 150a, 150b, 150c and 150d. The first sub-pixel 191 is electrically connected to the first gate line 111 and the data line 120. The second sub-pixel 192 is electrically connected to the second gate line 112 and the data line 120. The third sub-pixel 193 is electrically connected to the third gate line 113 and the data line 120. The fourth sub-pixel 194 is electrically connected to the fourth gate line 114 and the data line 120.

The first switch 211 has a terminal coupled to the first gate line 111 and another terminal coupled to both the second gate line 112 and a gate driver 216. The second switch 212 has a terminal coupled to the third gate line 113 and another terminal coupled to both the fourth gate line 114 and the gate driver 216. The third switch 213 has a terminal coupled to the first gate line 111. The fourth switch 214 has a terminal coupled to the third gate line 113.

In one embodiment, the first, second, third and fourth switches 211, 212, 213, and 214 respectively have control terminals 211t, 212t, 213t, and 214t that are coupled to a control element 220. The control element 220 is capable of providing one or more sets of control signals to control the first, second, third and fourth switches 211, 212, 213, and 214. In another embodiment, as depicted in FIG. 4C, the control terminals 211t and 212t are couple to a control element 220b, whereas the control terminals 213t and 214t are coupled to a control element 220a. The control element 220a controls the third and fourth switches 213, 214, and the control element 220b controls the first and second switches 211, 212.

Figure 4B:
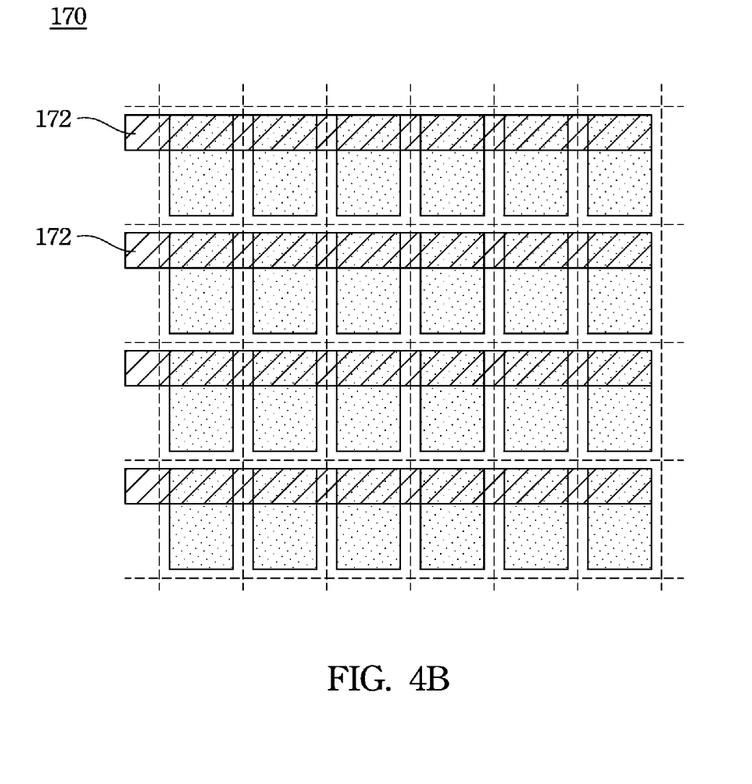
FIG. 4B is a top view schematically illustrating a second substrate of a display panel according to one embodiment of the invention.
Figure 4C:
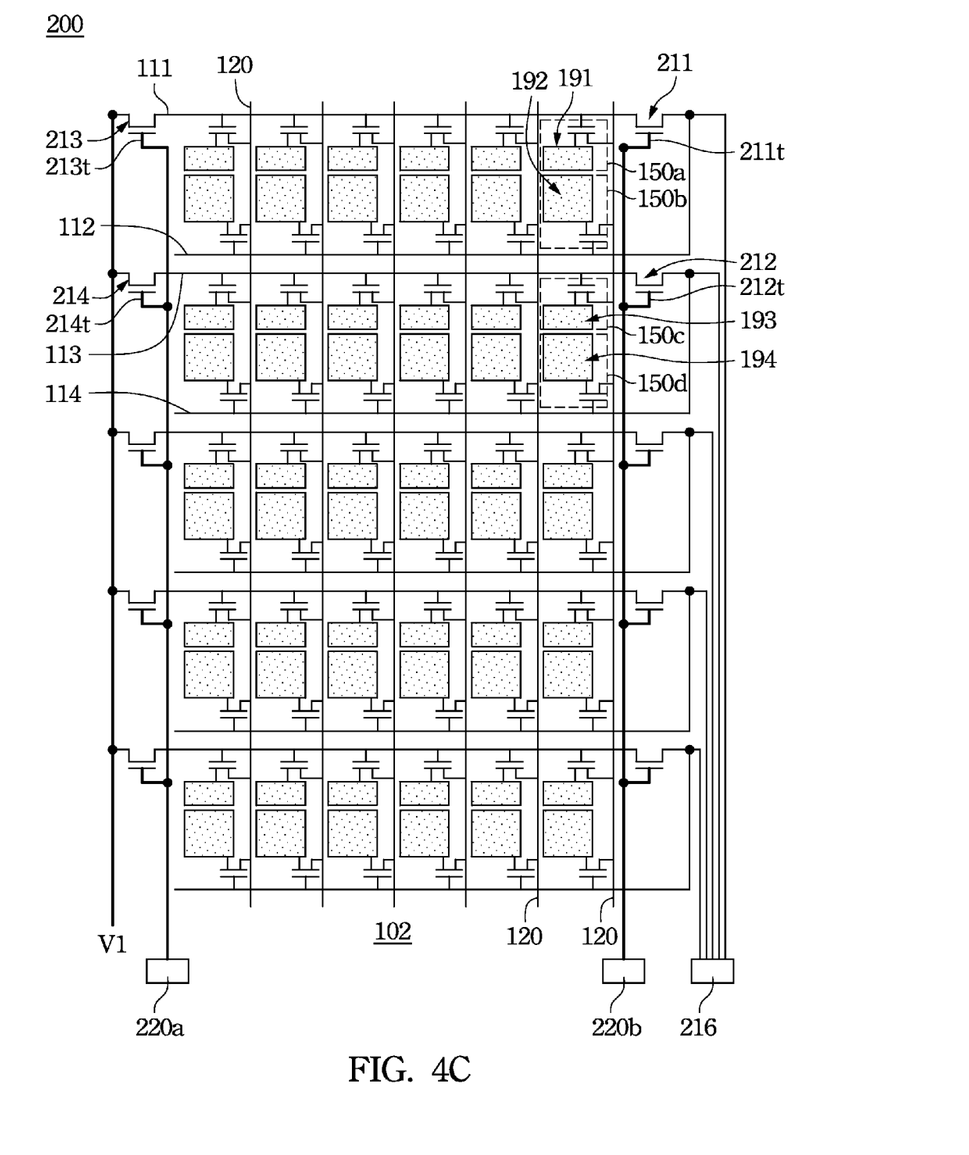
FIG. 4C schematically depicts a display panel according to another embodiment of the invention.

FIG. 4B is a top view schematically illustrating a second substrate 170 of the display panel 200 according to one embodiment of the invention. The second substrate 170 has a counter electrode 172 that is formed on a surface facing the first substrate 102. The counter electrode 172 corresponds to the first sub-pixel 191 and third sub-pixel 193. Specifically, the counter electrode 172 is disposed right above the first sub-pixel 191 and the third sub-pixel 193.

Referring to FIGS. 4A and 4B, in one embodiment, while the display panel 200 is set to be operated in the narrow viewing angle mode, both the first and second switches 211 and 212 are turned off, but the third and fourth switches 213 and 214 are turned on. The first gate line 111 and the third gate line 113 are coupled to a control signal V1 respectively through the third switch 213 and the fourth switch 214. Furthermore, the counter electrode 172 is coupled to a pre-determined electrical potential, and thereby a perpendicular electric field is generated between the counter electrode 172 and the first sub-pixel 191 as well as between the counter electrode 172 and the third sub-pixel 193. Under this condition, light leakage occurs within the first sub-pixel 191 and the third sub-pixel 193 at a large viewing angle, and therefore the display panel 200 exhibits a narrow viewing angle mode. The control signal V1 applied to the first gate line 111 and the third gate line 113 may be a substantially constant voltage or a square wave signal. In this embodiment, the gate driver 216 outputs a plurality of gate driving signals that are in sequence transmitted to the second gate line 112 and the fourth gate line 114. Accordingly, the voltage signals on the date line 120 may be transmitted to the second and fourth sub-pixels 192 and 194, respectively within the second and fourth display areas 150b and 150d, and therefore desirable information may be displayed.

More specifically, when the display panel 200 is operated in a narrow viewing angle mode, both the first and second switches 211 and 212 are turned off, and the first and third gate lines 111 and 113 are coupled to the control signal V1. Furthermore, the counter electrode 172 is coupled to a pre-determined electrical potential, such that the orientation of the display medium 180 (e.g. liquid crystal material) in the first and third display areas 150a and 150c is different from that in the second and fourth display areas 150b and 150d. In one specific example, within the first display area 150a and the third display area 150c, there is generated a perpendicular electric field with a direction perpendicular to the surface 171 of the second substrate 170. In contrast, within the second display area 150b and the fourth display area 150d, there is generated a horizontal electric field with a direction parallel with the surface 171 of the second substrate 170. In this example, the gate driver 216 outputs a plurality of gate driving signals that are in sequence transmitted to the second gate line 112 and the fourth gate line 114. Accordingly, the voltage signals on the date line 120 may be transmitted to the second and fourth sub-pixels 192 and 194, within the second and fourth display areas 150b and 150d respectively, and therefore desirable information may be displayed.

In another embodiment, while the display panel 200 is operated in a wide viewing angle mode, the third and fourth switches 213 and 214 are turned off, whereas the first and second switches 211 and 212 are turned on. The first, second, third and fourth gate lines 111, 112, 113 and 114 may receive the gate driving signals generated from the gate driver 216. In the wide viewing angle mode, the counter electrode 172 has a floating electrical potential.

Figure 5:
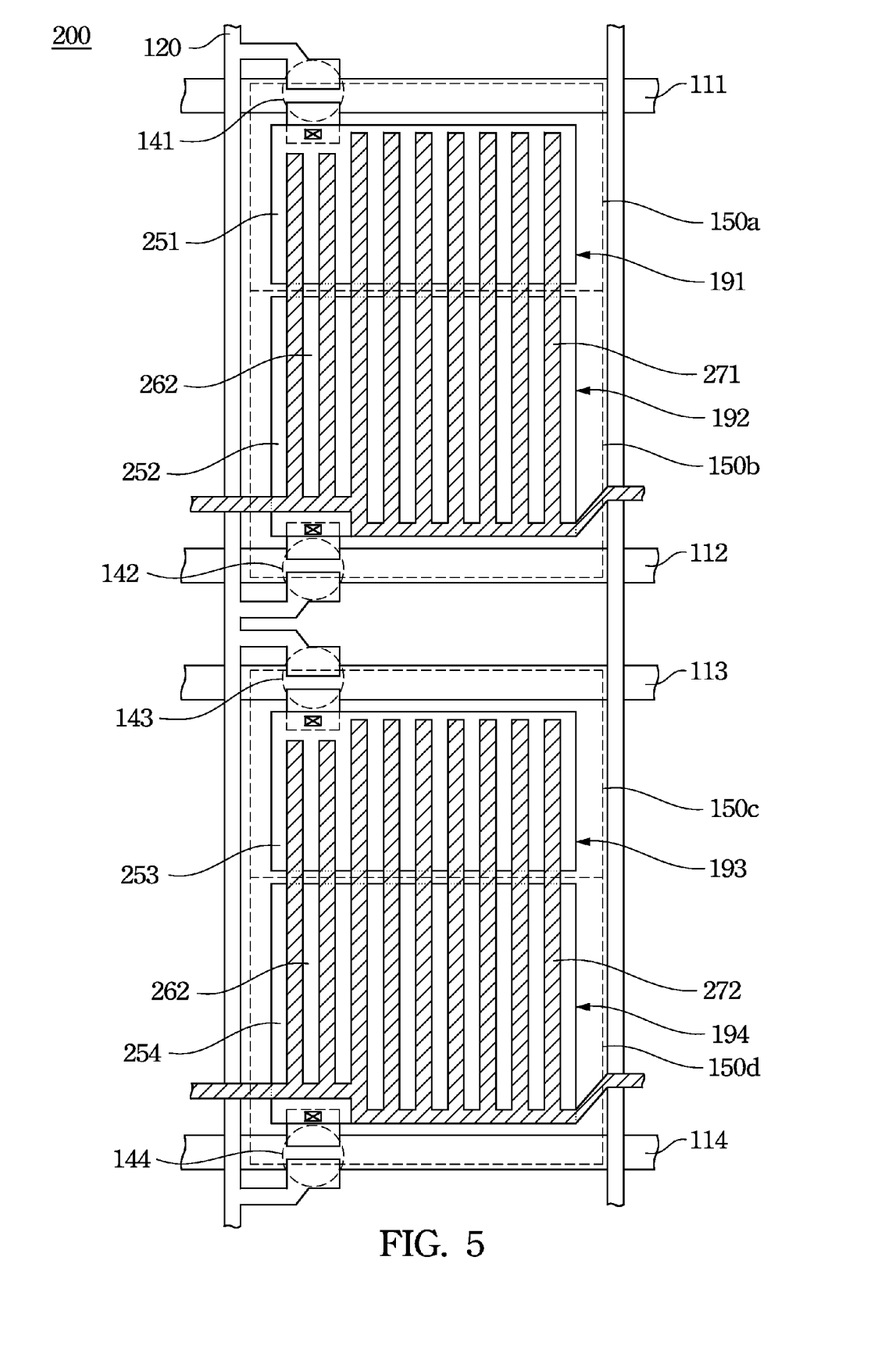
FIG. 5 is a top view schematically illustrating a first, a second, a third and a fourth sub-pixels of a display panel according to one embodiment of the invention.

FIG. 5 is a top view schematically illustrating a first, a second, a third and a fourth sub-pixels 191, 192, 193, and 194 of a display panel 200 according to one embodiment of the invention. The first sub-pixel 191 and the second sub-pixel 192 includes a first common electrode 271 disposed in the first display area 150a and the second display area 150b. The first sub-pixel 191 further includes a first active element 141 and a first sub-pixel electrode 251 electrically connected to the first active element 141. Similarly, the second sub-pixel 192 further includes a second active element 142 and a second sub-pixel electrode 252 electrically connected to the second active element 142. The first and second sub-pixel electrodes 251 and 252 are configured to be opposite to the first common electrode 271. In this embodiment, the first common electrode 271 has at least one slit 262. In some embodiments, however, the slit 262 may be formed in the first and second sub-pixel electrodes 251 and 252. In other words, the first common electrode 271 may have at least one slit pattern, or the first and second sub-pixel electrodes 251 and 252 may have at least one slit pattern according to the embodiments of the invention.

Similarly, the third sub-pixel 193 and the fourth sub-pixel 194 include a second common electrode 272 disposed in the third display area 150c and the fourth display area 150d. The third sub-pixel 193 further includes a third active element 143 and a third sub-pixel electrode 253 electrically connected to the third active element 143. The fourth sub-pixel 194 further includes a fourth active element 144 and a fourth sub-pixel electrode 254 electrically connected to fourth active element 144. The third and fourth sub-pixel electrodes 253 and 254 are opposite to the second common electrode 272. The second common electrode 272 has at least one slit pattern, or the third and fourth sub-pixel electrodes 253 and 254 have at least one slit pattern.

With reference to FIG. 4A and FIG. 5, when the display panel 200 is operated in a narrow viewing angle mode, the first switch 211 and the second switch 212 are turned off, and the first gate line 111 and the third gate line 113 are coupled to a substantially constant electrical potential. Moreover, the counter electrode 172 is coupled to a per-determined electrical potential, so that a perpendicular electric field is generated between the counter electrode 172 and the first sub-pixel electrode 251 as well as between the counter electrode 172 and third sub-pixel electrode 253. According to one example of the invention, the pre-determined electrical potential mentioned above ranges from an electrical potential of one of the first and second common electrodes 271, 272 to an electrical potential of one of the first, second, third and fourth sub-pixel electrodes 251, 252, 253, 254.

In one example, the first common electrode 271 is overlapped with the first and second sub-pixel electrodes 251 and 252. The second common electrode 272 is overlapped with the third and fourth sub-pixel electrodes 253 and 254. In addition, an insulating layer may be formed between each of the common electrodes 271, 272 and each of the sub-pixel electrodes 251, 252, 253, 254, and therefore the common electrodes 271 and 272 are not in contact with the sub-pixel electrodes 251, 252, 253 and 254.

Figure 6A:
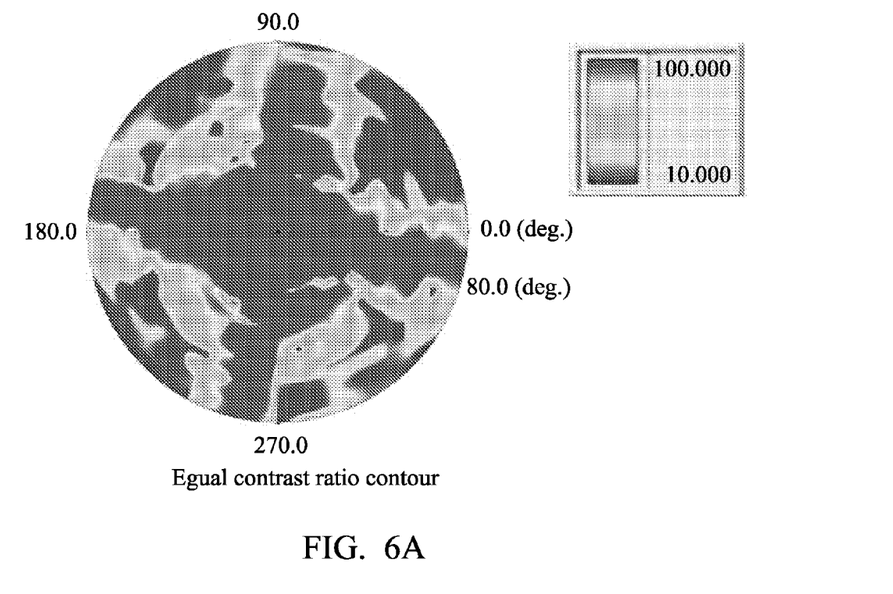
FIGS. 6A and 6B are graphs illustrating the characteristic of contrast ratios at different viewing angles of a display panel, respectively in a wide viewing angle mode and in a narrow viewing angle mode, according to one embodiment of the invention.
Figure 6B:
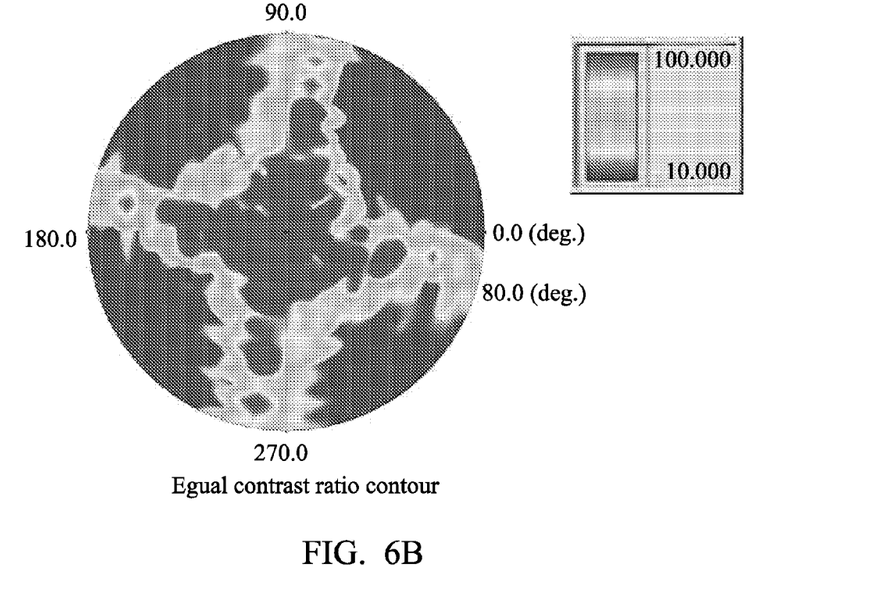

FIGS. 6A and 6B are graphs illustrating the characteristic of contrast ratios at different viewing angles of a display panel, respectively in a wide viewing angle mode and in a narrow viewing angle mode, according to one embodiment of the invention. In FIGS. 6A and 6B, the four scales in the radial direction represent viewing angles of 20°, 40°, 60° and 80°, that are the included angles between a normal direction of the display panel and each of the measured directions. The color in FIGS. 6A and 6B represents the contrast ratio of the display panel. When the display panel is operated in the wide viewing angle mode, as shown in FIG. 6A, the display panel exhibits a viewing angle of about 40° within which the contrast ratio is greater than 100. On the other hand, when the display panel is operated in the narrow viewing angle mode, the display panel exhibits a viewing angle of merely about 20° within which the contrast ratio is greater than 100, as shown in FIG. 6B. According to the embodiments disclosed herein, a display device may be selectively operated in a wide viewing angle mode or a narrow viewing angle mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pixel structure, comprising:
a first substrate;
a first gate line and a second gate line, disposed on the first substrate;
a data line, disposed on the first substrate and intersecting the first gate line and the second gate line;
a pixel unit disposed between the first gate line, the second gate line and the data line, the pixel unit comprising:
   a first active element electrically connected to the first gate line and the data line;
   a second active element electrically connected to the second gate line and the data line;
   a first sub-pixel electrode electrically connected to the first active element;
   a second sub-pixel electrode spaced apart from the first sub-pixel electrode, and electrically connected to the second active element; and
   a common electrode opposite to the first sub-pixel electrode and the second sub-pixel electrode, wherein the first and second sub-pixel electrodes or the common electrode has at least one slit pattern;
a second substrate comprising a counter electrode, wherein the counter electrode is disposed on a surface facing the first substrate, and the counter electrode is corresponding to the first sub-pixel electrode; and
a display medium disposed between the first substrate and the second substrate, wherein
when the counter electrode is applied with an electrical potential that is between an electrical potential of the common electrode and an electrical potential of the first sub-pixel electrode, the pixel structure is operated in a narrow viewing angle mode;
when the counter electrode is floating, the pixel structure is operated in a wide viewing angle mode.

2. The pixel structure according to claim 1, wherein the counter electrode is configured to apply an electrical potential such that a perpendicular electric field is formed between the counter electrode and the first sub-pixel electrode.

3. The pixel structure according to claim 1, wherein the counter electrode is substantially corresponding to the first sub-pixel electrode only.

4. The pixel structure according to claim 1, wherein the first sub-pixel electrode is spaced apart from the second sub-pixel electrode by a gap that extends in a direction parallel with the data line.

5. The pixel structure according to claim 1, wherein the first sub-pixel electrode is spaced apart from the second sub-pixel electrode by a gap that extends in a direction parallel with the first gate line.

6. The pixel structure according to claim 1, wherein the first sub-pixel electrode is spaced apart from the second sub-pixel electrode by a gap, wherein a portion of the gap extends in a direction parallel with the data line, and another portion of the gap extends in a direction perpendicular to the data line.

7. A display panel, comprising:
a first substrate;
a data line disposed on the first substrate;
a first gate line, a second gate line, a third gate line and a fourth gate line disposed on the first substrate and intersecting the data line, thereby defining a first display area, a second display area, a third display area and a fourth display area on the first substrate, wherein the first and second display areas are between the first gate line and the second gate line, and the third and fourth display areas are between the third gate line and the fourth gate line;
a first sub-pixel disposed in the first display area and electrically connected to the first gate line and the data line;
a second sub-pixel disposed in the second display area and electrically connected to the second gate line and the data line;
a third sub-pixel disposed in the third display area and electrically connected to the third gate line and the data line;
a fourth sub-pixel disposed in the fourth display area and electrically connected to the fourth gate line and the data line;
a second substrate comprising a counter electrode disposed on a surface thereof, wherein the counter electrode faces the first substrate, and is corresponding to the first sub-pixel and the third sub-pixel;
a display medium comprising liquid crystal material, the display medium being disposed between the first substrate and the second substrate;
a first switch, having a terminal coupled to the first gate line and another terminal coupled to the second gate line and a gate driver;
a second switch, having a terminal coupled to the third gate line and another terminal coupled to the fourth gate line and the gate driver;
a third switch having a terminal coupled to the first gate line; and
a fourth switch having a terminal coupled to the third gate line.

8. The display panel according to claim 7, wherein each of the first, second, third and fourth switches has a control terminal coupled to a control element that is configured to control a ON/OFF state of each of the first, second, third and fourth switches.

9. The display panel according to claim 7, wherein when the display panel is operated in a narrow viewing angle mode, the first and second switches are turned off and both the first and third gate lines are coupled to a control signal, wherein the counter electrode is coupled to a pre-determined electrical potential, such that a perpendicular electric field is formed between the counter electrode and the first sub-pixel and between the counter electrode and the third sub-pixel.

10. The display panel according to claim 9, wherein the control signal configured to the first and third gate lines is a substantially constant electrical potential.

11. The display panel according to claim 9, wherein the gate driver is configured to output a plurality of gate driving signals to the second gate line and the fourth gate line in sequence.

12. The display panel according to claim 7, wherein when the display panel is operated in a narrow viewing angle mode, the first and second switches are turned off and both the first and third gate lines are coupled to a control signal, wherein the counter electrode is coupled to a pre-determined electrical potential, such that the orientation of the liquid crystal material in the first and third display areas is different from that in the second and fourth display areas.

13. The display panel according to claim 12, wherein the first display area and the third display area are capable of generating a perpendicular electric field, and the second display area and the fourth display area are capable of generating a horizontal electric field.

14. The display panel according to claim 12, wherein the gate driver is configured to output a plurality of gate driving signals to the second gate line and the fourth gate line in sequence.

15. The display panel according to claim 7, wherein when the display panel is operated in a wide viewing angle mode, the third switch and the fourth switch are turned off, and the first switch and the second switch are turned on, and thereby allowing a plurality of gate driving signals to be transmitted to the first, second, third and fourth gate lines, wherein the counter electrode has a floating electrical potential.

16. The display panel according to claim 7, wherein
the first sub-pixel and the second sub-pixel comprise a first common electrode disposed in the first and second display areas, wherein the first sub-pixel comprises a first active element and a first sub-pixel electrode electrically connected to the first active element, and the second sub-pixel comprises a second active element and a second sub-pixel electrode electrically connected to the second active element, the first and second sub-pixel electrodes being configured to be opposite to the first common electrode, wherein the first and second sub-pixel electrodes or the first common electrode has at least one slit pattern;
the third sub-pixel and the fourth sub-pixel comprise a second common electrode disposed in the third display area and the fourth display area, wherein the third sub-pixel comprises a third active element and a third sub-pixel electrode electrically connected to the third active element, and the fourth sub-pixel comprises a fourth active element and a fourth sub-pixel electrode electrically connected to the fourth active element, the third and fourth sub-pixel electrodes being configured to be opposite to the second common electrode, wherein the third and fourth sub-pixels or the second common electrode has at least one slit pattern.

17. The display panel according to claim 16, wherein when the display panel is operated in a narrow viewing angle mode, the first and second switches are turned off and both the first and third gate lines are coupled to a substantially constant electrical potential, wherein the counter electrode is coupled to a pre-determined electrical potential, and thereby allowing a perpendicular electric field to be generated between the counter electrode and the first sub-pixel as well as between the counter electrode and the third sub-pixel.

18. The display panel according to claim 17, wherein the pre-determined electrical potential ranges from an electrical potential of one of the first and second common electrodes to an electrical potential of one of the first, second, third and fourth sub-pixel electrodes.

19. The display panel according to claim 17, wherein the first common electrode is overlapped with the first and second sub-pixel electrodes, and the second common electrode is overlapped with the third and fourth sub-pixel electrodes, and wherein an insulating layer is interposed between the first common electrode and the first and second sub-pixel electrodes as well as between the second common electrode and the third and fourth sub-pixel electrodes.

* * * * *